United States Patent [19]

Hayashi

[11] Patent Number: 4,583,930
[45] Date of Patent: Apr. 22, 1986

[54] APPARATUS FOR PRODUCING STRIP OF DOUGH HAVING CONSTANT DIMENSIONS AND FLOW RATE

[76] Inventor: Torahiko Hayashi, 3-4, Nozawa-machi, Utsunomiya-shi, Tochigi-ken, Japan

[21] Appl. No.: 720,760

[22] Filed: Apr. 8, 1985

[30] Foreign Application Priority Data

Apr. 9, 1984 [JP] Japan ................................. 59-69103
Jun. 8, 1984 [JP] Japan ................................. 59-116708

[51] Int. Cl.⁴ ................................................. B29C 41/52
[52] U.S. Cl. ................................. 425/148; 425/150; 425/371; 425/373; 426/502
[58] Field of Search ............... 425/145, 148, 150, 371, 425/373; 426/502

[56] References Cited

U.S. PATENT DOCUMENTS

| | | | |
|---|---|---|---|
| 4,056,346 | 11/1977 | Hayashi | 425/373 |
| 4,398,877 | 8/1983 | Taylor | 425/145 |
| 4,448,736 | 5/1984 | Emery et al. | 425/145 |

Primary Examiner—George Yeung
Attorney, Agent, or Firm—Guy W. Shoup

[57] ABSTRACT

An apparatus and method for continuously producing at a constant flow rate a strip of dough of constant dimensions by controlling the speed of a feed conveyor assembly when the dough is transferred from it onto a constant-speed conveyor. Dough is weighed and fed at speeds inversely proportional to the weighed measurements and the transferred dough is defined by a cooperative action of two constant-speed conveyors, defining members and a roller mechanism to define the dimensions of the dough strip.

7 Claims, 7 Drawing Figures

APPARATUS FOR PRODUCING STRIP OF DOUGH HAVING CONSTANT DIMENSIONS AND FLOW RATE

BACKGROUND OF THE INVENTION

1. Field of the Invention

This invention relates to an apparatus and method for continuously producing at a constant flow rate a strip of dough of constant dimensions while the dough is conveyed. More particularly, it relates to such apparatus and method whereby application of a pressure or stirring force to the dough is minimized, and the width and thickness of the dough strip is made uniform.

2. Description of the Prior Art

Continuous feeding of plastic dough having an elasticity and a viscosity such as, for example, bread dough, has hitherto been carried out through extrusion by a screw apparatus or through suction and extrusion by an extruder with piston and cylinder.

These apparatuses or processes, however, basically rely upon mechanical forces to form continuous dough strips. An excessive pressure is frequently imparted to the dough fed, or the dough is frequently severed with the screw during stirring. Such mechnical forces are harmful for the structure of dough, especially bread dough. The gel structure of the dough tends to be destroyed due to the pressure or stirring, and an extra step is required later for the recovery of the gel structure. Such step requires a further device and thus the overall size of the dough processing apparatus becomes bulky.

SUMMARY OF THE INVENTION

It is an object of the present invention to provide an apparatus for continuously producing at a constant flow rate a strip of dough of constant dimensions while the dough is conveyed. Another object of this invention is to provide a method of producing at a constant flow rate a strip of dough of constant dimensions without resorting to undue pressure or stirring forces.

In accordance with the present invention, an apparatus for continuously producing at a constant flow rate a strip 3 of dough of constant dimensions is provided, which comprises a dough weighing device located between the opposite ends of the conveying portion of said feed conveyor assembly to continuously measure the weight of each portion of the dough conveyed past the weighing device, a pressing means disposed at a predetermined fixed position above and adjacent to the rear end of said feed conveyor assembly, adapted to rotate about its own axis at substantially the same linear speed as the conveyor speed of at least the rear end portion of said feed conveyor assembly, a first constant-speed conveyor arranged in series with and adjacent to said feed conveyor assembly, a second constant-speed conveyor arranged in series with and adjacent to said first constant-speed conveyor, said second constant-speed conveyor being driven at a speed higher than that of said first constant-speed conveyor, a roller mechanism comprising a plurality of rollers rotatable about their axes and movable in unison in the same direction along an endless roller path, the peripheries of the moving rollers forming a closed envelope having a lower straight portion spaced, by a predetermined height, apart from and above the conveying portion of both said constant-speed conveyors, two defining members positioned, one on each side of the passage of the dough strip, between said straight portion of said endless roller path and said conveying portion of said first constant-speed conveyor to define the width of the dough, a control unit for controlling the speed of at least the rear end portion of said feed conveyor assembly at a speed inversely proportional to the weight of a dough portion measured so as to make constant the dimensions and flow rate of the strip of dough. According to the present invention, a method for continuously producing at a constant flow rate a strip of dough of constant dimensions is furthermore provided, which comprises registering a reference conveying weight of dough per unit time, continuously measuring the weight of portions of the dough conveyed per unit time, comparing the resulting measurements with said reference conveying weight of dough and changing the speed of a feed conveyor at a speed inversely proportional to the dough weight measured, feeding the dough onto a first constant-speed conveyor thereby making uniform the weight of each of dough portions of equal length, constricting the width of the dough to a given width while the thickness is regulated to provide a dough strip of given dimensions fed at a given flow rate.

DESCRIPTION OF THE PREFERRED EMBODIMENTS

Figure 1:
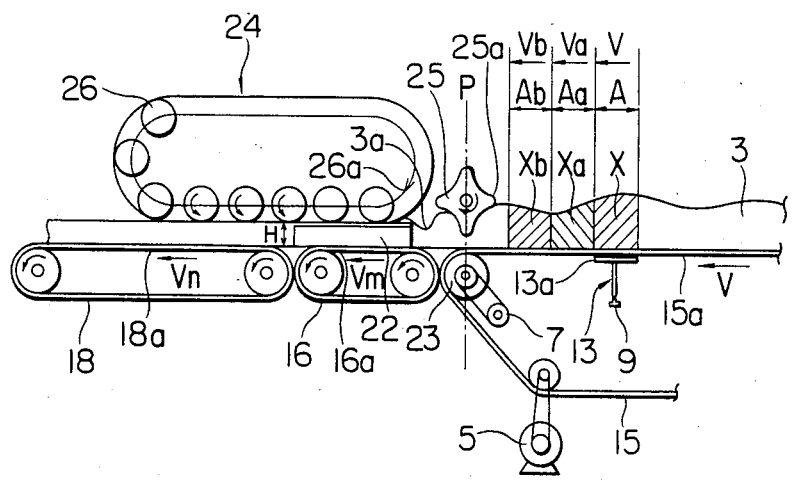
FIG. 1 is a side elevation view showing a first embodiment of the present invention.

As shown in FIG. 1, the apparatus of the present invention comprises a feed conveyor 15, a first constant-speed conveyor 16, and a second constant-speed conveyor 18, and the three conveyors give a conveyance plane with their belts 15a, 16a, and 18a. A weighing device 13 is disposed at a predetermined position underneath the lower surface of the belt 15a of the feed conveyor 15, and the portion of the weighing device 13 making contact with the belt 15a provides a weighing table 13a having a length A. A load sensor 9 measures the weight X of a portion of dough passing over the weighing table 13a, and the measured values are applied to a microcomputer 41 in a control unit described later.

A driven roller 23 which drives the conveyor 15 is driven by a motor 5, and a rotation transducer 7 which rotates in synchronism with the driven roller 23 is provided to generate pulses indicative of the length of movement of the belt 15a.

The conveyor 16 arranged adjacent to the end portion of the feed conveyor 15 is driven at a constant speed and receives the dough fed from the feed conveyor 15. A pressing means in the form of a roller 25 is provided at a predetermined fixed position above and adjacent to the end of the feed conveyor 15. The roller 25 has four projections 25a and rotates about its own axis at substantially the same linear speed as the speed of the belt 15a to form compressed portions 3a on the upper surface of the dough 3. As explained later, roller 25 can be without any projections.

A second constant-speed conveyor 18 is arranged in series with and adjacent to the rear end of the first constant-speed conveyor 16 and conveys the dough from the conveyor 16 at a constant speed higher than that of the first constant-speed conveyor 16 and supplies the dough to a subsequent station.

Figure 3:
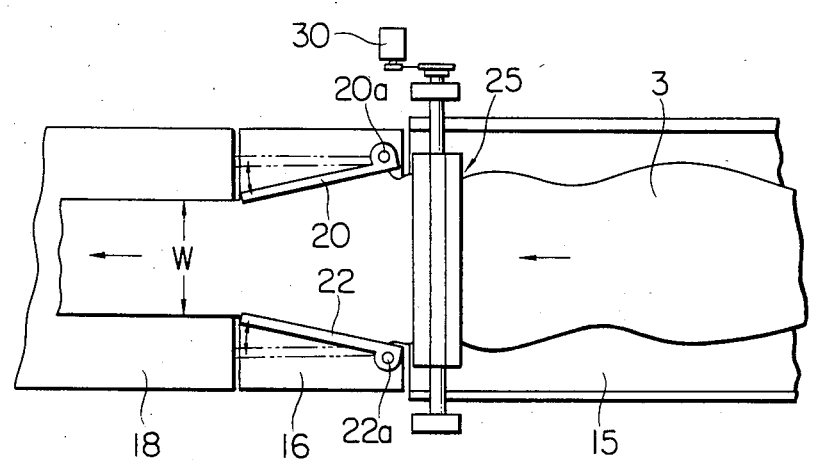
FIG. 3 is a plan view of the apparatus using a rotary member having linear projections.

A roller mechanism 24 is positioned above the first and second constant speed conveyors, and comprises a plurality of rollers 26 and is adapted to move in unison along an endless roller path. The peripheries of the moving rollers 26 forms a closed envelope having a lower straight portion spaced, by a predetermined height H, apart from and above the conveying portion of both the first constant-speed conveyor 16 and the second constant-speed conveyor 18. The height H can be smaller in the second constant-speed conveyor region than in the first constant-speed conveyor region, because the high speed alloted to the second conveyor can compensate for the decrease in height. Each roller can rotate about its axis and moves in the same direction indicated by an arrow line 26a in FIG. 1. The speed of movement of the rollers along the endless roller path is substantially higher than the second constant-speed conveyor so that if the rollers are freely rotatable, when they come into contact with the dough on the conveyors, the rollers start rotating about their axes in the direction of the arrows as indicated in FIG. 1. The direction of rotation may be mechanically fixed by any suitable means. Two defining members 20 and 22 are mounted on the frame of the apparatus as shown in FIG. 3, and positioned between the lower straight portion of the roller mechanism 24 and the first constant-speed conveyor 16 as shown in FIG. 1. Each member can be a plate and is pivotally mounted at 20a and 22a.

The members are movable about their upstream ends 20a, 22a toward and away from each other for setting a predetermined distance between the free downstream ends of the members so as to define the width of a strip of dough passing therethrough. It is also within the scope of the invention to fix the defining members at a predetermined position to define the width of the dough strip.

Figure 2:
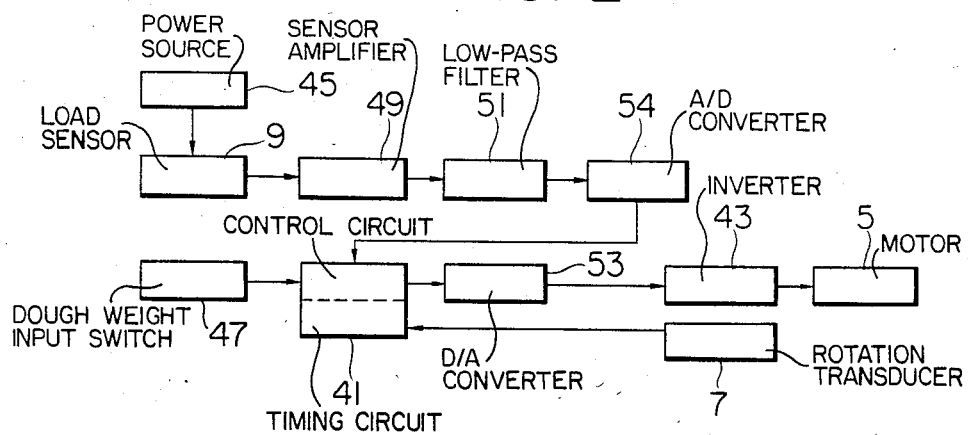
FIG. 2 is a block diagram of a control unit of an embodiment of the present invention.

As shown in FIG. 2, a control unit employed in the present invention includes a microcomputer 41 as its principal component, and the measured values from the load sensor 9 and the pulses from the rotation transducer 7 are applied to the microcomputer 41. A power source 45 applies a voltage to the load sensor 9 where the weight of the dough 3 is sensed and converted into voltages in proportion of the weight measured. A sensor amplifier 49 amplifies the sensor voltage. A low-pass filter 51 permits only the passage of frequencies lower than 10 Hz from the sensor voltage. Since the sensor voltage includes noise due to vibration of the conveyor, etc., the low-pass filter 51 is used to remove such noise, so that frequencies higher than 10 Hz are cut off to improve the S/N ratio. The noise-free sensor voltage is transmitted to a control circuit of the microcomputer 41 through an A/D coverter 54. The A/D converter 54 serves to convert an alternating current from the low-pass filter 51 into a direct current. It is often the case that the load sensor 9 produces sizable voltages due to extraneous objects on the conveyor even when it carries no dough, and in such an instance the voltage indication must be adjusted to zero. To achieve this, the output from the low-pass filter 51 is transmitted to a control circuit of the microcomputer 41, where a signal is produced to set the output voltage from the sensor amplifier 49 at zero. A D/A converter 53 serves to convert a direct current from the microcomputer 41 into an alternating current. A dough weight input switch 47 acts as means for setting a production rate per unit time. A timing circuit of the microcomputer 41 receives from a rotation transducer 7 pulses coresponding to the length of movement of the belt 15a. The microcomputer 41 computes in response to the input values so as to control the drive motor 5, and consequently, the driven roll 23 of the conveyor 15 through an inverter 43.

When the weight of the unit length A of the dough 3 is heavy, the motor 5 is driven at a lower speed Va, while, when the weight of the unit length A of the dough is light, the motor 5 is driven at a higher speed Vb.

The roller 25 above and adjacent to the rear end of the feed conveyor 15 produces compressed portions 3a in the dough 3 so that the dough can always move at the same speed as that of the feed conveyor 15. The rollers 26 in the roller mechanism 24 also hold the dough. Particularly, the roller 26 which first comes into contact with the dough on the first constant-speed conveyor defines a space between it and the roller 25 for stretching or compressing the dough therebetween depending on the measurement made at the weighing device 13. The dough is conveyed at a constant speed by the first constant-speed conveyor 16. The dough from the feed conveyor 15, by the cooperative action of the roller 25 and the belt 15a, is fed at various speeds controlled with the control unit thereby stretching or compressing the dough between the rollers 26 and the roller 25.

The operation of the individual constituent members of the apparatus of the invention will now be described.

A production rate of dough per unit time is applied to the microcomputer 41 by a dough weight input switch 47 to register a reference conveying weight of dough. The dough 3 previously shaped into a web form is placed on the feed conveyor 15 by the operator, and the weighing device 13 measures the weight of the unit length A of the dough 3 being conveyed on the feed conveyor 15. That is, each time the rotation transducer 7 detects that the dough has been conveyed by a distance equal to the length A, the microcomputer 41 applied a measurement command to the weighing device 13, and, in response to the above command, the load sensor 9 applies the measured value X as an input to the microcomputer 41.

Each time the arrival of a dough portion An, having a measured weight Xn at the delivery end P of the feed conveyor 15, is detected by the microcomputer 41 as the result of the input applied from the rotation transducer 7, the microcomputer 41 calculates and automatically sets the velocity Vn of the conveyor 15 corresponding to the measured weight Xn of the dough portion An. When the weight Xa of the unit length A of the dough 3 is heavier than the reference value, the dough 3 is conveyed at a lower speed Va, and when the weight Xb of the unit length A of the dough 3 is ligher than the reference value, the dough 3 is conveyed at a higher speed Vb. The relation between the speed of the conveyor 15 and the weight of the dough portion is expressed as follows:

$$Xa.Va = Xb.Vb = \text{Constant}$$

The measurements are compared with the reference conveying weight of dough by the microcomputer 41 and the difference between the reference conveying weight and the measurements are transmitteed to an inverter 43 through a D/A converter 53, as signals. The signals are changed into values inversely proportional to the measurements to drive a motor 5. Thus, the speed V of the dough portion delivered from the conveyor 15 is inversely proportional to the weight X of the dough portion.

When the dough being conveyed on the feed conveyor 15 is divided into dough portions Aa, Ab, ..., each having a unit length A, they have necessarily different weights X. Therefore, for each of the individual weighted portions of the dough conveyed by the feed conveyor 15 and arriving at the conveyor's delivery end P, the conveyor 15 is driven at a speed V which always changes. The speed decreases when the measured weight is heavier than the standard value, while it increases when the measured weight is lighter than the standard value.

Therefore, during the transfer of the dough onto the first constant-speed conveyor 16, a dough portion having a heavy unit weight is stretched, while a dough portion having a light weight is compressed. Thus, a dough web 3 having a constant unit weight is conveyed onto the first constant-speed conveyor 16.

In the aforementioned embodiment of the present invention, the unit length A of the weighing table 13a of the weighing device 13 can be freely selected. Therefore, when the length A is selected to be a short distance, the weight of the dough can be measured more accurately. The change in the measurement of weight of the dough can thus be more precisely differentiated, and the differentiated values of weight change are converted into inversely proportional speeds at the delivery end of the dough feed conveyor 15. In this manner, the speed of the conveyor 15 during transfer of the dough between the conveyors is minutely controlled so that quantification of the dough can be accurately achieved.

Figure 4:
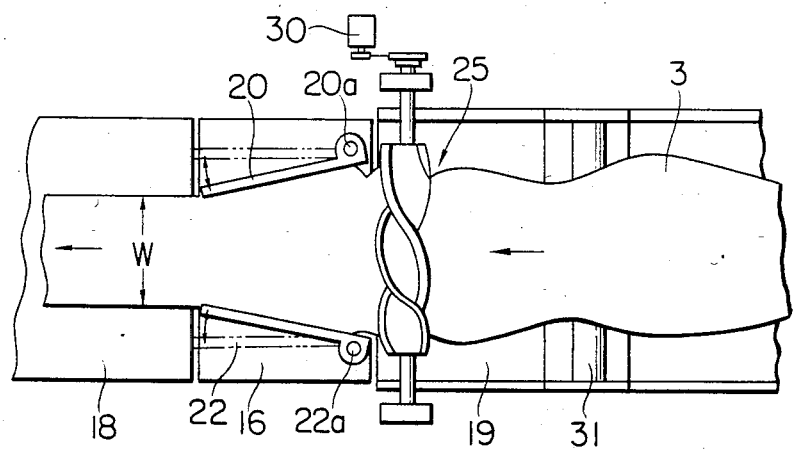
FIG. 4 is also a plan view of the apparatus using a rotary member having helical projections.

In the present invention, the roller 25 is illustrated as having projections 25a. The roller 25, however, is not necessarily required to have projections. The interval between the projections may be progressively narrowed to facilitate accurate weighing. If the interval is narrowed to the extreme, the roller will become a cylindrical one. Such a roller is also within the concept of this invention. Again, any other suitable pressing device may also be employed. For example, a rotary member 25 having helical projections may be used as shown in FIG. 4.

The dough, thus stretched or compressed, is fed onto the first constant-speed conveyor 16, and the width of the dough is defined by the defining members 20 and 22 to a predetermined width.

Figure 5:
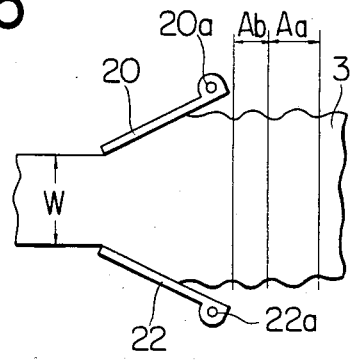
FIG. 5 illustrates the state of dough transferred onto a constant-speed conveyor.

Portions of the dough 3 of a length A proceeding to the first constant-speed conveyor 16 are subjected to tension that is inversely proportional to its weight X. Therefore, the dough portions Aa and Ab will result in having lengths different from each other, as shown in FIG. 5, each portion comprising substantially the same amount of dough, thereby making even the flow rate of dough and the variation in the flow rate is limited to an insignificant range. That is, the fluctuation in the weight of dough portions becomes restricted to within each portion of dough.

The dough fed onto the first constant-speed conveyor 16 is defined by the defining members 20 and 22 as described above, while being concurrently defined by the plurality of rollers 26 and the conveyor 16. Since the second constant-speed conveyor 18 is run at a higher speed than the first constant-speed conveyor 16, the dough flows smoothly regardless of the restriction of the width of the dough strip. When the dough is fed to the second constant-speed conveyor, the thickness of the dough fed becomes constant, whereby a dough strip having constant dimensions is produced at a uniform flow rate. The dough is then fed from the second constant-speed conveyor 18 to a subsequent processing station.

Figure 6:
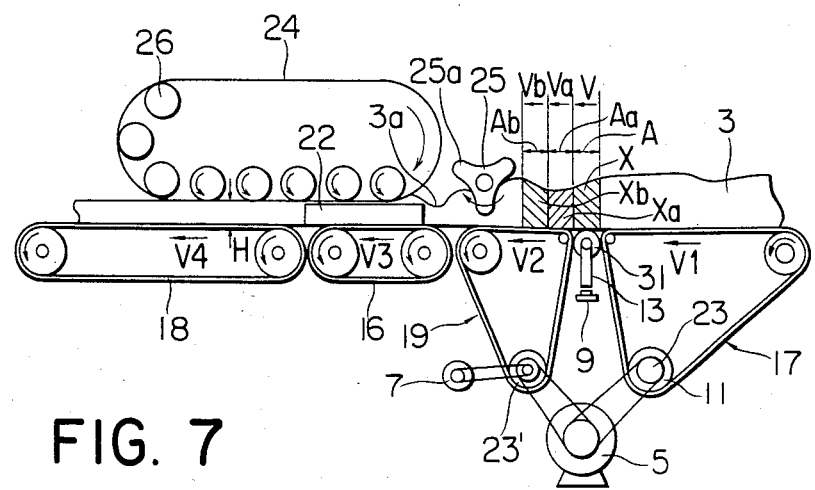
FIG. 6 is a side elevation view showing a second embodiment of the present invention.

A second embodiment of the invention will next be described. As shown in FIG. 6, there are provided two feed conveyors 17 and 19 and a weighing device 13 is disposed between the two conveyors.

A first constant-speed conveyor 16 is arranged in series with a second feed conveyor 19 and pressing means 25 is disposed in the same relative positions as that in the first embodiment. A first feed conveyor 17 and the second feed conveyor 19 are both driven by a motor 5, through a driven roller 23 and a driven roller 23', respectively. A rotation transducer 7 is associated through a transmitting means with the driving part of the second feed conveyor 19. The first feed conveyor 17, a roller 31 of the weighing device 13, the second feed conveyor 19, and the first constant-speed conveyor 16 give a conveyance plane. Normally, the first and second feed conveyors 17 and 19 are driven at the same speed by the motor 5, but the movement of the first feed conveyor 17 can be stopped when necessary. A clutch 11 is mounted on the rotary shaft of the driven roller 23 so that transmission of the rotary movement of the motor 5 can continue or be interrupted. A maximum weight value of the dough portions to be weighed by the weighing device 13 is previously set. When the weight of the dough portions conveyed from the first feed conveyor exceeds the set value, the clutch 11 associated with the driven roller 23 of the first feed conveyor 17 is actuated to interrupt transmission of the drive force of the motor 5 to the first feed conveyor 17, so that the conveying movement of the first feed conveyor 17 is stopped until the weight of the dough falls below the set value.

While the first feed conveyor 17 stays still, the dough 3 on the weighing device 13 is stretched between the first feed conveyor 17 and the second feed conveyor 19, resulting in a reduced weight. Therefore, the weight of the dough transferred onto the second feed conveyor 19 becomes reduced to fall within a certain predetermined range, so that the quantifiable range of the dough weight can be further improved.

Figure 7:
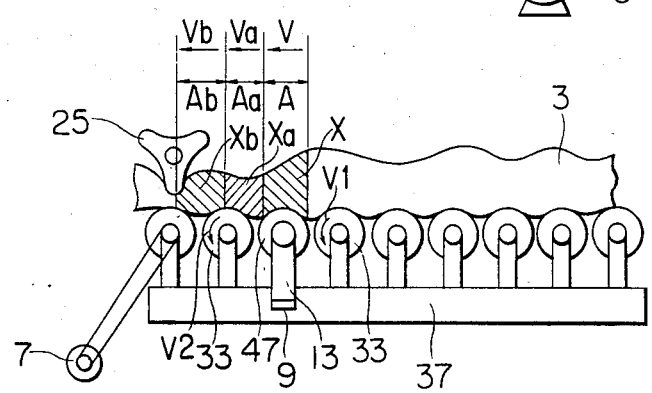
FIG. 7 is a side elevation view partly showing a third embodiment of the present invention.

A third embodiment of the present invention will next be described. As shown in FIG. 7, a plurality of revolving rollers 33 are juxtaposed to constitute a roller conveyor assembly 37, which is used for the conveyance of dough 3. One of the rollers 33 is replaced with a load-receiving roller 47 to function as a weighing device 13, and a load sensor 9 is associated with the load-receiving roller 47 to measure the weight of the dough passing over it. The rollers 33 rotate in synchronism with one another, while the roller 47 rotates either freely or driven by a motor built in them.

The manner of control is such that, when the weight of a unit length A of the weighed dough 3 is relatively heavy, the motor 5 decreases the rotation speed of the rollers 33, while, when the weight of a unit length A of the weighed dough 3 is relatively light, the motor 5 increases the rotation velocity of the rollers 33. Also, when the load sensor 9 senses a weight heavier than a predetermined value, the rotation of the rollers 33 upstream of the weighing device 13 is stopped until the weight becomes lighter than the predetermined value.

In the second and third embodiments, the roller 31, 47 may be driven by the motor built in the roller so that the load except for the weight of the dough, may not act upon the sensor, thereby further improving the accuracy. If the motor were externally positioned and the force causing the rotation of the roller 47 were transmitted therefrom, the moment of rotation of the roller shaft, driven by the external source, would act upon the load sensor 9 as a load other than the weight of the dough, making accurate measurement impossible. Again, even if a freely rotatable idle roller is used, the surface friction on the roller changing from time to time due to the movement of the dough in turn causes the movement of the dough to change, thereby providing the load sensor with inaccurate information affected by extraneous noises and impairing precise measurement.

According to the apparatus of the present invention, which has a constitution as described above, the width and thickness of the dough strip can be easily maintained constant while the dough is being conveyed, even when the dough is fed in a non-uniform state.

When the present invention is applied to a bread-making process, the bread-making apparatus can be reduced in scale because the gel structure of the dough is not destroyed in the process and no steps to restore the gel structure are required.

Further, although the aforementioned embodiments have referred to the handling of bread dough by way of example, the present invention is in no way limited to such embodiments, and it is apparent in view of the constitution thereof that the present invention is also applicable to an apparatus conveying other elastic and viscous materials such as foodstuffs including noodles and fish pastes, and other high-molecular materials, while quantifying the flow rate and defining dimensions thereof.

I claim:

1. An apparatus for continuously producing at a constant flow rate a strip of dough of constant dimensions comprising:
    a feed conveyor assembly for continuously feeding the dough,
    a dough weighing device located between the opposite ends of the conveying portion of said feed conveyor assembly to continuously measure the weight of each portion of the dough conveyed past the weighing device,
    a pressing means disposed at a predetermined fixed position above and adjacent to the rear end of said feed conveyor assembly, adapted to rotate about its own axis at substantially the same linear speed as the conveyor speed of at least the rear end portion of said feed conveyor assembly,
    a first constant-speed conveyor arranged in series with and adjacent to said feed conveyor assembly,
    a second constant-speed conveyor arranged in series with and adjacent to said first constant-speed conveyor, said second constant-speed conveyor being driven at a speed higher than that of said first constant-speed conveyor,
    a roller mechanism positioned above the first and second constant-speed conveyors, and comprising a plurality of rollers rotatable about their axes and movable in unison in the same direction, along the endless roller path, as the direction of movement of the dough strip, the peripheries of the moving rollers forming a closed envelope having a lower straight portion spaced, by a predetermined height, apart from and above the conveying portion of both said constant-speed conveyors,
    two defining members positioned, one on each side of the passage of the dough strip, between said straight portion of said endless roller path and said conveying portion of said first constant-speed conveyor to define the width of the dough,
    a control unit for controlling the speed of at least the rear end portion of said feed conveyor assembly at a speed inversely proportional to the weight of a dough portion measured so as to make constant the dimensions and flow rate of the strip of dough.

2. An apparatus according to claim 1, wherein the feed conveyor assembly comprises a first feed conveyor and a second feed conveyor arranged in series with said first feed conveyor, and a weighing device is located between said two conveyors.

3. An apparatus according to claim 1, wherein the feed conveyor assembly comprises one or more belt conveyors.

4. An apparatus according to claim 1, wherein the feed conveyor assembly is a roller conveyor having a plurality of rollers, and one of rollers of said roller conveyor is replaced with a weighing device having a roller for contacting with the dough being conveyed to receive the load of the dough.

5. An apparatus according to claim 1, wherein said pressing means is a rotary member having linear projections on its outside surface.

6. An apparatus according to claim 1, wherein said pressing means is a rotary member having helical projections on its outside surface.

7. An apparatus according to claim 1, wherein said two defining members are mounted at their upstream ends on the frame of the apparatus and are arranged to move toward or away from each other so that free ends of said members define the width of the dough.

* * * * *